United States Patent
Wagner

(10) Patent No.: US 8,029,867 B1
(45) Date of Patent: Oct. 4, 2011

(54) METHOD TO DRAW WITH COLOR ON PAPER

(75) Inventor: Charles Richard Wagner, Fayetteville, TN (US)

(73) Assignee: Charles Richard Wagner, Fayetteville, TN (US)

( * ) Notice: Subject to any disclaimer, the term of this patent is extended or adjusted under 35 U.S.C. 154(b) by 597 days.

(21) Appl. No.: 12/286,157

(22) Filed: Sep. 29, 2008

Related U.S. Application Data

(60) Provisional application No. 61/005,373, filed on Dec. 6, 2007.

(51) Int. Cl.
*C09D 10/00* (2006.01)

(52) U.S. Cl. ............... 427/385.5; 106/31.64; 428/306.6; 523/161

(58) Field of Classification Search ............... 427/385.5; 523/161; 428/306.6; 106/31.64
See application file for complete search history.

(56) References Cited

U.S. PATENT DOCUMENTS

| | | | | |
|---|---|---|---|---|
| 4,600,327 A | * | 7/1986 | Guzman | 401/18 |
| 5,417,748 A | * | 5/1995 | Kawashima | 106/31.19 |
| 5,514,415 A | * | 5/1996 | Gupta | 427/271 |
| 5,964,931 A | * | 10/1999 | Korper | 106/31.93 |
| 6,083,618 A | * | 7/2000 | Causton et al. | 428/327 |
| 7,147,392 B2 | * | 12/2006 | Bedhome et al. | 401/35 |
| 7,163,575 B2 | * | 1/2007 | Kwan et al. | 106/31.32 |
| 7,229,487 B2 | * | 6/2007 | Godbout | 106/31.32 |
| 7,452,146 B2 | * | 11/2008 | Godbout | 401/17 |
| 2005/0053416 A1 | * | 3/2005 | Kwan et al. | 401/270 |
| 2005/0100388 A1 | * | 5/2005 | Bedhome et al. | 401/35 |
| 2005/0150423 A1 | * | 7/2005 | Godbout | 106/31.32 |
| 2006/0032398 A1 | * | 2/2006 | Godbout et al. | 106/31.32 |
| 2006/0249245 A1 | * | 11/2006 | Balling et al. | 156/241 |
| 2007/0231494 A1 | * | 10/2007 | Godbout | 427/402 |
| 2010/0047004 A1 | * | 2/2010 | Bedhome et al. | 401/17 |

* cited by examiner

*Primary Examiner* — Gregory Webb

(57) ABSTRACT

Two already known items are combined to provide a means to draw with color on paper especially at an office work place using a set of felt tipped markers and a typist's correction fluid.

8 Claims, 1 Drawing Sheet

METHOD TO DRAW WITH COLOR ON PAPER

CROSS-REFERENCED TO RELATED APPLICATIONS

Provisional Patent Application No. 61/005,373 filing date Dec. 6, 2007

FEDERALLY SPONSORED

Not Applicable

SEQUENCE LISTING OR PROGRAM

Not Applicable

BACKGROUND OF THE INVENTION

Field of Invention

This invention relates to a type of artistic expression or a practice of drawing with color on paper.

BACKGROUND OF THE INVENTION

The genesis of this invention is my novel education: Bachelor of Fine Arts (BFA), Painting and Drawing, 1974, Arizona State University and Master of Science (MS), Industrial Engineering, 1979, University of Arizona.

Studying Fine Arts first and Engineering second was hard, but latter it caused me to work in an Engineering Office and have a need to practice my art at the same time as my engineering.

I practiced my art using supplies from the office. At first a felt tipped marker, having a blunt drawing nib and harsh, dark colors and a typist's correction fluid seemed unusual drawing tools.

1. Prior Art

Chinese White is an opaque white paste, comes in a tube and sometimes is sold in stores next to said felt tipped markers. Chinese White is the color white with similar properties to said typist's correction fluid. And if there is a greater purpose for Chinese White other than as the color white for said felt tipped markers, it is not advertised.

2. Objects and Advantages

Accordingly, several objects and advantages of the present invention are:

(a) to provide a means to draw with a color(s) from said felt tipped markers on a paper, especially a sheet of 8×11 inch office paper.

(b) to provide a means to draw with said color on said paper such that an error, or a mistake made while drawing on said paper, is corrected easily and quickly.

(c) to provide a means to draw with said color on said paper such that an act of drawing, where the end result of said act of drawing is a finished drawing, can commence impulsively and spontaneously without prior study or plans, thereby allowing for a form of sketching.

(d) to provide a means to draw with said color on said paper such that said finished drawing is drawn in a spontaneous style of art.

(e) to provide a means to draw with said color on said paper such that said finished drawing is a well prepared sketch and a means of preparation for an intended oil painting or an intended acrylic painting, where said well prepared sketch takes about a few hours to prepare and is not an usual, ten minute, rough, thumbnail sketch.

(f) to provide a means to draw with said color on said paper such that said finished drawing resembles or looks similar to a painting having brush marks and new, complex colors from said colors mixing and blending together on the drawing.

(g) to provide a means to draw with said color on said paper such that said well prepared sketch, having looks similar to a painting, is a model or an object to copy from for said intended painting.

(h) to provide a means to draw with said color on said paper such that personal correspondence and letters sent by mail can be decorated with designs, doodles and other forms of artistic embellishments in color.

(i) to provide a means to draw with said color on said paper so as to allow for a practice of drawing in an office or at work during brief pauses from a regular office work.

(j) to provide a means to draw with said color on said paper and a means to relax during brief pauses from said regular office work and thereby to allow for a practice of a form of art therapy.

SUMMARY

In accordance with the present invention a method allows a practice of drawing with color on paper using a felt tipped marker in combination with a typist's correction fluid.

DETAILED DESCRIPTION

Preferred Embodiment

A preferred embodiment of the method of the present invention consists of:

(a) a set of said felt tipped markers, especially ones with a ¼ inch nib at one end of a hand held hollow tube and with liquid said color inside to wet said nib for marking on paper with said color in a variety of hue.

(b) a 0.7 fluid ounce bottle of said typist's correction fluid, having especially a small blunt tipped applicator brush attached to a plastic screw on top;

(c) a thinner for said typist's correction fluid;

(d) a sheet of said paper or better grade of drawing paper. 8½×11 inch said paper is the preferred size because it is proportional in size to said felt tipped marker's ¼ inch drawing nib and said typist's correction fluid's small applicator brush.

Operation

Preferred Embodiment

The operation of the present invention is: Sitting at a desk, looking at a blank sheet of said paper, one thinks about what to draw. One makes mostly random and general marks with said felt tipped marker until a mark suggests an idea or looks like a familiar object. One might call said familiar object a germ of the drawing, such that every drawing mark that comes after is directed towards producing said finished drawing of said familiar object. Finding said germ of the drawing is a process similar to one seeing by a power of imagination said familiar object in a cloud.

Accordingly, the intention is to draw said familiar object as a three dimensional object having a warm color side and a cool color side and a gradual transition from warm color to cool color in a middle place. And where said middle place is the highest point of said object and the closest point to an eye of a viewer and therefore said middle place is lighter in value than said sides. And where said middle place has a greater build up of dried said typist's correction fluid than on said sides.

When an error is made during a drawing process it is brushed over with a layer of quick drying said typist's correction fluid. When said typist's correction fluid dries said error is redrawn. Said errors are corrected repeatedly as said drawing evolves causing a build up of dried said typist's correction fluid on said paper.

Said build up of dried said typist's correction fluid effects a coloration of said drawing in the following ways:

(a) said typist's correction fluid adheres to said paper as a dense opaque mass; when said color absorbs into said dense opaque mass Et lighter and softer color is made by a process of diffusion;

(b) said typist's correction fluid acts as a medium to hold said color onto said paper; and to provide a place, where said colors can mix together to make new complex colors from being applied one said color on top of another coincidentally.

Description

Additional Embodiment

There are several ways to improve the present invention:

(a) said typist's correction fluid should dry to a hard plastic like finish and not be chalky;

(b) said felt tipped marker's drawing nib sometimes clogs such that a flow of said color is restricted from said felt tipped marker to said paper;

(c) said felt tipped marker sometimes provides for an insufficient flow of said color from said drawing nib onto said paper;

(d) said color from said felt tipped marker is harsh and dark;

(e) said typist's correction fluid's applicator brush is small and stubby.

Operation

Additional Embodiment

The above description identifies several ways to improve the present invention. The effect to the present invention from the above improvements would be:

(a) When said typist's correction fluid dries to a chalky finish, said chalky finish can clog said drawing nib of said felt tipped marker and thereby to restrict a liquid flow of said color onto said paper; but if said typist's correction fluid dries to a hard plastic like finish, said drawing nib will not clog.

(b) A said drawing nib that was never clogged by said chalky finish would better an ease of operation of the present invention.

(c) An insufficient flow of said color from said drawing nib onto said paper could result from said felt tipped marker being old and said color being dry. Put if said liquid flow of color could be controlled by a device to be squeezed or pumped by hand on said felt tipped marker and also to allow for a refilling of said felt tipped marker with said color said ease of operation would be bettered.

(d) Said color from said felt tipped marker diffuses when said color is marked on the dried dense opaque mass of said typist's correction fluid. The result is an improvement to the original harsh and dark said color such that said color becomes lighter and softer and thereby more useful to the present invention as a color for drawing on said paper.

(e) Said typist's correction fluid's small and stubby brush could be replaced with a larger brush; although said typist's correction fluid's brush is sufficiently effective as is.

Conclusion, Ramifications, and Scope

Accordingly, the present invention is method to draw with said color on said, paper using said felt tipped market and, said typist's correction fluid by combined effect. In said method said typist's correction fluid adheres to said paper and acts as a medium to hold said color onto said paper; and whereby provides a place for said colors to mix together coincidentally from repeated applications of one said color upon another; and thereby to create new complex colors from said color absorbing into the dry dense opaque mass of said typist's correction fluid. In addition, the quick drying property of said typist's correction fluid allows for a spontaneous form of drawing without preparation called sketching. Furthermore, the present invention has the additional advantages in that it provides a softening of said color such that said color becomes more useful and viable as a color for drawing, especially as it pertains to the present invention;

it provides a lightening of said color such that said color becomes more useful and viable as a color for drawing, especially as it pertains to the present invention;

it provides an end result or said finished drawing to look similar to a painting with brush marks and to have complex colors;

it provides a method to prepare for a painting with a thumbnail sketch, where said thumbnail sketch, like said finished drawing, is a well crafted drawing taking some hours to complete and not a ten minute rough sketch;

it provides said finished drawing with an appearance similar to a painting and therefore with a usefulness as a model to be copied from for an intended painting, because said finished drawing is more than just an approximate guide or an aid as is true of a ten minute rough sketch;

it provides a use for ordinary office supplies as a means to draw with said color on said paper;

it provides a method enabling desk bound office workers to practice an art of drawing with said color on said paper side by side with the regular office work during many and brief pauses to the regular office work;

it provides a relaxation for desk bound office workers during many and brief pauses to the regular office work;

it provides a balance to the stress of the regular office work from a relaxing break from the regular work and thereby making possible a practice of an art therapy;

it provides a method of decoration of personal correspondence and letters sent by mail with embellishments of colored designs and doodles;

it provides a method to use ordinary office supplies and to enable desk bound office workers to practice said art of drawing because said method is inconspicous, nondisruptive and minimal.

Accordingly, as a demonstration of the utility of the present invention a sample drawing is enclosed. The reader will see that said sample drawing is encased in plastic laminate. Said plastic laminate or framed and behind glass is a preferred and intended way to best display to a viewer said finished drawing with a support for an often flimsy said paper, a perfectly flat surface and an unifying glint of light from a glossy glass surface.

I claim:

1. A method for drawing with color on paper, comprising:
   (a) providing a means for using a set of felt tipped markers for drawing with a color on paper,
   (b) providing a means for using a typist's correction fluid for drawing with said color on paper,
   (c) providing a means for using a thinner for thinning said typist's correction fluid for drawing with said color on paper,
   (d) providing a means for using a paper for drawing with said color especially a white sheet of 8½×11 inch loose-leaf paper,
   (e) providing a means for mixing together by a coincidental placement of one said color on top of a second said color for creating a third said color or a complex color and by absorbing into a dry dense mass of said typist's correction fluid adhering to said paper and thereby improving said color for drawing with said method,
   (f) providing a means for lightening said color by absorbing into said dry dense mass of said typist's correction fluid adhering to said paper and thereby improving said color for drawing with said method,
   (g) providing a means for softening said color by said color diffusing into said dry dense mass of said typist's correction fluid and thereby improving said color for drawing with said method,
   (h) providing a means for correcting in seconds an error made while drawing and thereby allowing for a type of drawing that completes an end result or a finished drawing in one single continuous drawing session of about some hours unencumbered by delays waiting for an oil paint to dry for example.

2. The method of claim 1 wherein providing a means for correcting said errors easily in seconds and whereby rendering as obsolete a need to preplan or to prepare for said continuous drawing session due to a low cost associated with making and correcting said errors and thereby allowing for a type of drawing called sketching or drawing without preparation.

3. The method of claim 2 wherein providing a means for said continuous drawing session and thereby allowing for using said finished drawing as a thumbnail sketch or a means for preparing for an oil painting.

4. The method of claim 3 wherein providing a means for preparing said thumbnail sketch whereby said thumbnail sketch is a well crafted said finished drawing having brush marks and said complex colors and therefore having a look similar to a small painting and whereby said thumbnail sketch is like a model to be copied from for an intended painting and therefore more than a typical ten minute thumbnail sketch and thereby improving upon said thumbnail sketch.

5. The method of claim 1 wherein providing a means for using ordinary office supplies as drawing tools that are inconspicuous nondisruptive and minimal whereby allowing for a type of drawing as suitable as any for an office work place and whereby said type of drawing is practiced side by side with a regular office work during many brief and restful pauses from said regular office work throughout a work day and thereby providing for a means for empowering an office worker to draw with said color on said paper at said office work place such that at a day's end one said finished drawing is produced.

6. The method of claim 5 wherein providing a means for said office worker to take a break from said regular office work and to relax and thereby allowing for a counter balance to stress and strain in said office work place and therefore a practice of a form of art therapy.

7. The method of claim 2 wherein providing a means for correcting said errors easily and quickly and thereby emboldening a novice artist to decorate letters sent by mail and personal correspondence with embellishments of designs and doodles in color.

8. The method of claim 1 wherein providing a means for using a liquid form of a chinese white paste or any similar opaque white paste to dray with said color on said paper.

* * * * *